2,932,554
PRODUCTION OF URANIUM TETRAFLUORIDE

David A. Collins and John S. Nairn, Seascale, England, assignors to United Kingdom Atomic Energy Authority, London, England No Drawing. Application June 28, 1957
Serial No. 668,607

Claims priority, application Great Britain June 28, 1956

5 Claims. (Cl. 23—14.5)

This invention relates to the production of uranium tetrafluoride.

We have investigated the possibility of preparing uranium tetrafluoride from uranium hexafluoride and carbon tetrachloride by a vapour-phase process, and have discovered that, in order to avoid the production of a uranium tetrafluoride product contaminated with solid intermediate uranium fluorides, such as $UF_5$, $U_2F_9$ and $U_4F_{17}$, the conditions under which the reaction is performed must be closely controlled, particularly when the process is performed by mixing streams of the reactant vapours. We have found that a uranium tetrafluoride product of satisfactory purity can be obtained by the use of a temperature of 150° to 400° C., and with the use of carbon tetrachloride and uranium hexafluoride in a ratio of from 2 to 4.5 molar proportions of carbon tetrachloride to 1 molar proportion of uranium hexafluoride. (Since the molecular weights of these compounds are 154 and 352 respectively, the proportions by weight employed are from 308 to 693 parts by weight of $CCl_4$ to 352 parts by weight of $UF_6$.)

We have also found that by employing a temperature of 270° to 350° C. and molecular proportions of from 2.5 to 3.7 of carbon tetrachloride to 1 of uranium hexafluoride, the reaction proceeds with the formation of large proportions of the valuable chlorofluorocarbons $CCl_3F$ and $CCl_2F_2$.

When the process is performed by mixing streams of carbon tetrachloride and uranium hexafluoride vapours, the streams are preferably pre-heated to a temperature of at least 150° C. before being mixed, in order to speed up the reaction.

The reaction is catalysed by the uranium tetrafluoride formed.

The invention is illustrated by the following example.

Example

The apparatus employed in the process illustrated in this example was of a well-known kind and included an inclined nickel-lined stainless steel rotary kiln, of volume 14 litres and of length/internal diameter ratio 14:1, mounted at its ends on roller bearings bolted to a framework having adjustable legs by which the slope of the kiln could be varied. The kiln could be rotated by a chain drive and heated by a furnace which included almost the whole of the kiln within the roller bearings.

Two concentric stainless steel tubes entered the upper end of the kiln through a polytetrafluoroethylene seal; the outer tube was for the admission of carbon tetrachloride vapour and the inner was for the admission of uranium hexafluoride vapour. The inner tube had a constricted orifice to prevent back-diffusion of carbon tetrachloride vapour. Attached to these inlet tubes was a nickel deflector plate by which the streams of reactant vapours issuing from the tubes were deflected downwards and thus rapidly mixed.

The lower end of the kiln entered a settling chamber through a polytetrafluoroethylene seal. This chamber included a valve-closable outlet for solids at its lower part, and a pipe for effluent vapours at its upper part.

The kiln was equipped with a scraper to prevent solid uranium tetrafluoride from building up on the kiln wall, and with a nickel thermocouple pocket which extended along the central axis of the kiln and enabled the temperature to be recorded at the inlet, middle and outlet of the kiln.

With the kiln inclined at 7½° to the horizontal and rotated at 10 revolutions per minute, streams of uranium hexafluoride vapour and dry carbon tetrachloride vapour each pre-heated to 200° C. were admitted at a pressure about 15 mm. of mercury above atmospheric to the inner and outer co-axial tubes respectively, the ratio of inflow rates being adjusted to 1 molecular proportion of uranium hexafluoride to 3.1 molecular proportions of carbon tetrachloride, with an absolute flow rate of uranium hexafluoride equivalent to 1 kilogram of uranium per hour. The kiln was heated so as to maintain the greater part of its length at a temperature between 285° and 310° C., that part of the kiln immediately adjacent the exit being at a temperature of 170°.

The solid product formed by reaction gradually progressed towards the lower end of the rotating kiln (the mean residence time of the product in the kiln was 15 minutes) and entered the settling chamber, from which it was removed periodically via the outlet at the chamber's lower part. The product thus obtained was uranium tetrafluoride substantially free from intermediate fluorides and containing 0.4% by weight of $UO_2F_2$, this latter material having arisen through reaction of the $UF_6$ with moisture. The product was then blown with dry air at 300° C. to remove absorbed vapours.

The effluent vapours leaving the settling chamber by way of the pipe at the chamber's upper part passed to a dust-removal system where fine particles of uranium tetrafluoride were recovered. Those vapours, thus freed from solid material, were then cooled to 20° C., when most of the excess carbon tetrachloride condensed, and then passed to a caustic soda scrubber unit in which chlorine was adsorbed and further carbon tetrachloride was condensed. The vapours leaving the scrubber unit, which vapours consisted mainly of $CCl_3F$ and $CCl_2F_2$ with very small amounts of $CClF_3$ and previously uncondensed carbon tetrachloride, were then treated for the recovery of these materials, partly by adsorption on charcoal and partly by condensation to minus 20° C. followed by fractional distillation.

Carbon tetrachloride recovered from the effluent vapours was purified by standard procedures and re-circulated in the process.

The invention has particular application to the conversion to $UF_4$ of $UF_6$ enriched with respect to U235.

We claim:

1. A process for the preparation of uranium tetrafluoride comprising subjecting to a temperature of 150° to 400° C. a mixture of carbon tetrachloride and uranium hexafluoride vapours, in which mixture there are from 2 to 4.5 molar proportions of carbon tetrachloride to 1 molar proportion of uranium hexafluoride.

2. A process for the preparation of uranium tetrafluoride comprising mixing streams of uranium hexafluoride and carbon tetrachloride vapours in a ratio such as to give a mixture in which there are from 2 to 4.5 molar proportions of carbon tetrachloride to 1 molar proportion of uranium hexafluoride, and subjecting the mixed streams to a temperature of 150° to 400° C.

3. A process according to claim 2, in which the streams of uranium hexafluoride and carbon tetrachloride vapours are heated to a temperature of at least 150° C. before they are mixed.

4. A process for the preparation of uranium tetrafluoride comprising mixing streams of uranium hexafluoride and carbon tetrachloride vapours in a ratio such as to give a mixture in which there are from 2.5 to 3.7 molar proportions of carbon tetrachloride to 1 molar proportion of uranium hexafluoride, and subjecting the mixed streams to a temperature of 270° to 350° C.

5. A process for the preparation of uranium tetrafluoride comprising separately preheating to a temperature of at least 150° C. streams of uranium hexafluoride and carbon tetrachloride vapours, mixing these pre-heated vapour streams in a ratio such as to give a mixture in which there are from 2.5 to 3.7 molar proportions of carbon tetrachloride to 1 molar proportion of uranium hexafluoride, and subjecting the mixed streams to a temperature of 270° to 350° C.

References Cited in the file of this patent
UNITED STATES PATENTS

| | | |
|---|---|---|
| 2,638,406 | Tevebaugh et al. | May 12, 1953 |
| 2,735,746 | McCombie et al. | Feb. 21, 1956 |

OTHER REFERENCES

AEC Document MDDC–1412, Aug. 18, 1945.